US007693306B2

(12) United States Patent
Huber

(10) Patent No.: US 7,693,306 B2
(45) Date of Patent: Apr. 6, 2010

(54) SYSTEM AND METHOD FOR CAPTURING IMAGES FROM MOBILE DEVICES FOR USE WITH PATRON TRACKING SYSTEM

(75) Inventor: Doug Huber, Louisville, KY (US)

(73) Assignee: Konami Gaming, Inc., Las Vegas, NV (US)

( * ) Notice: Subject to any disclaimer, the term of this patent is extended or adjusted under 35 U.S.C. 154(b) by 1079 days.

(21) Appl. No.: 11/276,310

(22) Filed: Feb. 23, 2006

(65) Prior Publication Data

US 2006/0205458 A1 Sep. 14, 2006

Related U.S. Application Data

(60) Provisional application No. 60/659,630, filed on Mar. 8, 2005.

(51) Int. Cl.
*G06K 9/00* (2006.01)
*H04N 7/18* (2006.01)

(52) U.S. Cl. ...................... 382/115; 382/103; 382/218; 348/129; 348/143; 463/13

(58) Field of Classification Search ................ 382/100, 382/103, 115, 118, 209, 217–219, 305–306; 348/129–130, 143; 463/13–29
See application file for complete search history.

(56) References Cited

U.S. PATENT DOCUMENTS

| | | | | | |
|---|---|---|---|---|---|
| 4,521,014 | A | | 6/1985 | Sitrick | |
| 4,572,509 | A | | 2/1986 | Sitrick | |
| 5,202,759 | A | * | 4/1993 | Laycock | 348/152 |
| 5,218,344 | A | * | 6/1993 | Ricketts | 340/573.4 |
| 5,218,627 | A | * | 6/1993 | Corey et al. | 348/14.11 |
| 5,373,440 | A | * | 12/1994 | Cohen et al. | 705/14.12 |
| 5,396,227 | A | * | 3/1995 | Carroll et al. | 340/825.36 |
| 5,461,390 | A | * | 10/1995 | Hoshen | 342/419 |
| 5,515,419 | A | * | 5/1996 | Sheffer | 455/456.5 |
| 5,621,388 | A | * | 4/1997 | Sherburne et al. | 340/573.4 |
| 5,742,233 | A | * | 4/1998 | Hoffman et al. | 340/573.1 |
| 5,761,647 | A | | 6/1998 | Boushy | |
| 5,893,095 | A | * | 4/1999 | Jain et al. | 707/6 |
| 6,035,055 | A | * | 3/2000 | Wang et al. | 382/118 |

(Continued)

FOREIGN PATENT DOCUMENTS

EP 1320250 A1 6/2003

(Continued)

*Primary Examiner*—Manav Seth
(74) *Attorney, Agent, or Firm*—Howard & Howard Attorneys PLLC

(57) ABSTRACT

A system and method of tracking a patron in a gaming environment uses a database that stores known images and known text descriptions of existing patrons. An image of a patron is captured by an image capture device, and a text description of the patron is obtained. The image and the text description are transmitted to the database. A comparator compares the image or the text description to those on the database. The image is stored in a patron folder if the image or the text description is found to match an existing patron. The image is stored in a temporary folder if the image or the text description fails to match one of the existing patrons, and once the patron has been identified, the image is transferred from the temporary folder to the patron folder.

20 Claims, 4 Drawing Sheets

U.S. PATENT DOCUMENTS

| | | | | |
|---|---|---|---|---|
| 6,142,876 | A | 11/2000 | Cumbers | |
| 6,234,900 | B1 | 5/2001 | Cumbers | |
| 6,294,993 | B1 * | 9/2001 | Calaman | 340/539.18 |
| 6,345,274 | B1 * | 2/2002 | Zhu et al. | 707/5 |
| 6,350,199 | B1 * | 2/2002 | Williams et al. | 463/16 |
| 6,554,705 | B1 | 4/2003 | Cumbers | |
| 6,612,928 | B1 * | 9/2003 | Bradford et al. | 463/29 |
| 6,775,397 | B1 | 8/2004 | Hamalainen | |
| 6,782,419 | B2 | 8/2004 | Tobita et al. | |
| 7,327,890 | B2 * | 2/2008 | Fredlund | 382/218 |
| 2001/0003182 | A1 * | 6/2001 | Labelle | 707/3 |
| 2002/0049908 | A1 | 4/2002 | Shimosato et al. | |
| 2002/0132663 | A1 | 9/2002 | Cumbers | |
| 2002/0165801 | A1 | 11/2002 | Stern et al. | |
| 2003/0030731 | A1 | 2/2003 | Colby | |
| 2003/0035567 | A1 | 2/2003 | Chang et al. | |
| 2003/0039380 | A1 | 2/2003 | Sukegawa et al. | |
| 2003/0056113 | A1 | 3/2003 | Korosec | |
| 2003/0063778 | A1 | 4/2003 | Rowe et al. | |
| 2003/0069071 | A1 * | 4/2003 | Britt et al. | 463/42 |
| 2003/0092489 | A1 | 5/2003 | Veradej | |
| 2003/0164819 | A1 | 9/2003 | Waibel | |
| 2003/0176218 | A1 | 9/2003 | LeMay et al. | |
| 2004/0003295 | A1 * | 1/2004 | Elderfield et al. | 713/202 |
| 2004/0008258 | A1 | 1/2004 | Aas et al. | |
| 2004/0008906 | A1 | 1/2004 | Webb | |
| 2004/0066419 | A1 | 4/2004 | Pyhalammi | |
| 2004/0106449 | A1 * | 6/2004 | Walker et al. | 463/25 |
| 2004/0119851 | A1 | 6/2004 | Kaku | |
| 2004/0131235 | A1 | 7/2004 | Chen et al. | |
| 2004/0131236 | A1 | 7/2004 | Chen et al. | |
| 2004/0207720 | A1 | 10/2004 | Miyahara et al. | |
| 2004/0208372 | A1 | 10/2004 | Boncyk et al. | |
| 2004/0213437 | A1 | 10/2004 | Howard et al. | |
| 2004/0263631 | A1 | 12/2004 | Brittan et al. | |
| 2005/0078174 | A1 | 4/2005 | Casey et al. | |
| 2005/0096084 | A1 | 5/2005 | Pohja et al. | |
| 2009/0092290 | A1 * | 4/2009 | Rowe | 382/115 |

FOREIGN PATENT DOCUMENTS

| | | | |
|---|---|---|---|
| WO | 02/086801 | A1 | 10/2002 |
| WO | 2004/089010 | A1 | 10/2004 |

* cited by examiner

SYSTEM AND METHOD FOR CAPTURING IMAGES FROM MOBILE DEVICES FOR USE WITH PATRON TRACKING SYSTEM

CROSS REFERENCE TO RELATED APPLICATION

This application claims the benefit of provisional patent application Ser. No. 60/659,630 filed Mar. 8, 2005.

BACKGROUND OF THE INVENTION

1. Field of the Invention

The present invention is a system and method of tracking a patron in a gaming environment to distinguish between existing patrons and new patrons and to track their gaming activities.

2. Description of the Prior Art

Various systems and methods relating to tracking a patron in a gaming environment are known in the art. The patron tracking systems and methods of the prior art include an image capture device such as a camera to capture an image of the patron. A text input device is used with the image capture device to generate a text description of the image, and a communication software program combines the image with the text description into an electronic communication, such as an e-mail. A database stores a plurality of known images and known text descriptions, and an image filer in communication with the database files the image in the database at a file location.

Although the prior art systems and methods relating to patron tracking are employed by various industries, there remains an opportunity for a patron tracking system and method that is able to distinguish between existing patrons and new patrons.

SUMMARY OF THE INVENTION AND ADVANTAGES

The subject invention is a method of tracking a patron in a gaming environment to distinguish between existing patrons and new patrons and to track their gaming activities. The method utilizes at least one database having a patron folder and a temporary folder and storing a plurality of known images and known text descriptions. The method comprises the steps of photographing the patron to create an image, obtaining a text description of the patron, linking the image and the text description together into an electronic communication, transmitting the electronic communication to the database, and comparing at least one of the image and the text description to the plurality of known images and known text descriptions stored in the database. The method further includes the step of storing at least one of the image and the text description in one of the patron folder and the temporary folder to distinguish between the existing patrons and the new patrons and to track their gaming activities.

The invention further provides a system for tracking a patron that comprises an image capture device for capturing an image of a patron and a text input device in communication with the image capture device for providing a text description of the image. A communication software program is used in communication with the image capture device and the text input device to combine the image and the text description into an electronic communication. A database is in communication with the image capture device, and the database includes a plurality of known images and known text descriptions. An image filer is in communication with the database and files the image in the database at a file location. Furthermore, the system includes a comparator in communication with the database and the image capture device that compares at least one of the image and the text description with the plurality of known images and known text descriptions stored on the database.

The advantages of the subject invention include a system and method that can distinguish between an existing patron and a new patron. Also, a system and method is provided that temporarily stores the image of the new patron and activity data relating to the new patron until a new patron folder is opened. Moreover, a system and method is provided that verifies that compensation and rewards go to the correct patron.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
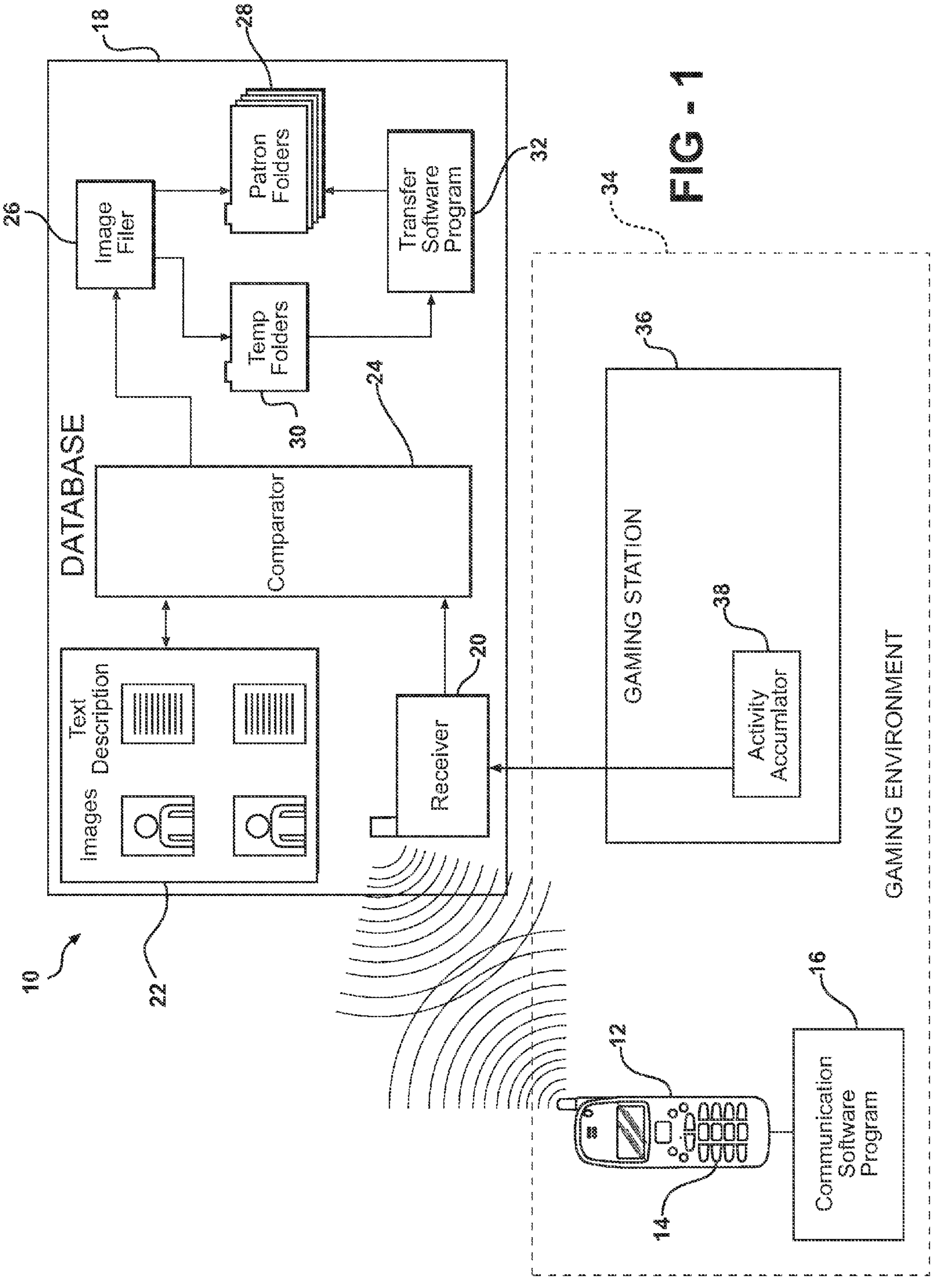
FIG. 1 is an illustration of a patron tracking system in a gaming environment assembled in accordance with the subject invention.

Referring to the Figures, wherein like numerals indicate corresponding parts throughout the several views, a patron tracking system is shown generally at 10. Referring specifically to FIG. 1, the system 10 includes an image capture device 12 for capturing an image associated with a person, e.g., a patron, a player, technician, or other employee. The image can be a portrait or other picture or image of a person, or image of an identification instrument, such as a driver's license, passport, retina, or digitized thumbprint.

The image capture device 12 can be any device capable of taking a photograph, or preferably, a digital photograph. Such image capture devices 12 include a camera, or a remote device such as a cellular phone or a personal digital assistant (PDA) equipped with a camera.

Next, the system 10 has a text input device 14 in communication with the image capture device 12 for creating a text description of the image. The text input device 14 connects to the image capture device 12 peripherally, such as a keyboard that plugs into the image capture device 12 or alternatively, the text input device 14 is integral with the image capture device 12. For example, the text input device 14 may be a keypad that exists on the cellular phone or the PDA. The text description created by the text input device 14 can be any textual representation that helps identify the image at a later time. Examples of the text description include the patron's name, a description of the patron's physical appearance, an account number associated with the patron, or any other patron identifier that is used to link the patron to the image.

The image capture device 12 operates a communication software program 16 that combines the image and the text description into an electronic communication such as an e-mail. In the case of e-mail, the image and the text description are placed in a body of the email, or alternatively, the text description is placed in a subject line of the e-mail. In addition, the communication software program 16 designates an address in which to send the electronic communication. The image capture device 12 includes a transmitter to wirelessly transmit the electronic communication. Alternatively, the image capture device 12 connects to a docking station that is in communication with a wired network.

The electronic communication is transmitted via wireless communication or through the wired network to a database 18 located at the address designated by the communication software program 16. A receiver 20 is in communication with the database 18 and is used to receive the image and the text description from the image capture device 12. The receiver 20 employs wireless communication as shown in FIG. 1 or alternatively the receiver 20 connects to the image capture device 12 through the wired network.

The database 18 stores a plurality of known images and known text descriptions 22 that represent each existing patron in a group of existing patrons. A comparator 24 receives the image and the text description from the receiver 20 and analyzes at least one of the image and the text description to determine whether the patron is one of the existing patrons. An image filer 26 receives the image from the comparator 24 and files the image in the database 18 at a file location depending on the output of the comparator 24. If the image or the text description corresponds to one of the existing patrons, then the image filer 26 stores the image in a patron folder 28 that relates to the existing patron on the database 18. If the image or the text description fails to correspond to one of the existing patrons, then the image filer 26 stores the image in a temporary folder 30 on the database 18. The temporary folder 30 holds the image until the patron is identified. After the patron has been identified, a transfer software program 32 is used by the database 18 to move the image from the temporary folder 30 to the patron folder 28 corresponding with the patron. Alternatively, the temporary folder 30 is renamed to match the text description of the image to the new patron.

The system 10 as described is used in various industries. For example, the patron tracking system 10 may be used in a gaming environment 34. In the gaming environment 34, a gaming station 36 is in communication with the database 18. The gaming environment 34 is known by those in the art to include but is not limited to casinos or other locations where gaming occurs. The gaming station 36 is known by those in the art to include but is not limited to gaming tables for blackjack, craps, roulette, poker, and the like, or stand-alone machines such as a slot machine or an electronic card-playing machine. The gaming station 36 operates an activity accumulator 38 that collects activity data about the patron. The activity data includes how much the patron has wagered, the amount of time the patron spent at the gaming station 36, and other information relating to the patron's gaming activity. The activity data is transmitted to the database 18 via wireless communication or through the wired network as depicted in FIG. 1. After being transmitted to the database 18, the activity data is stored in the patron folder 28 along with the image.

Figure 2:
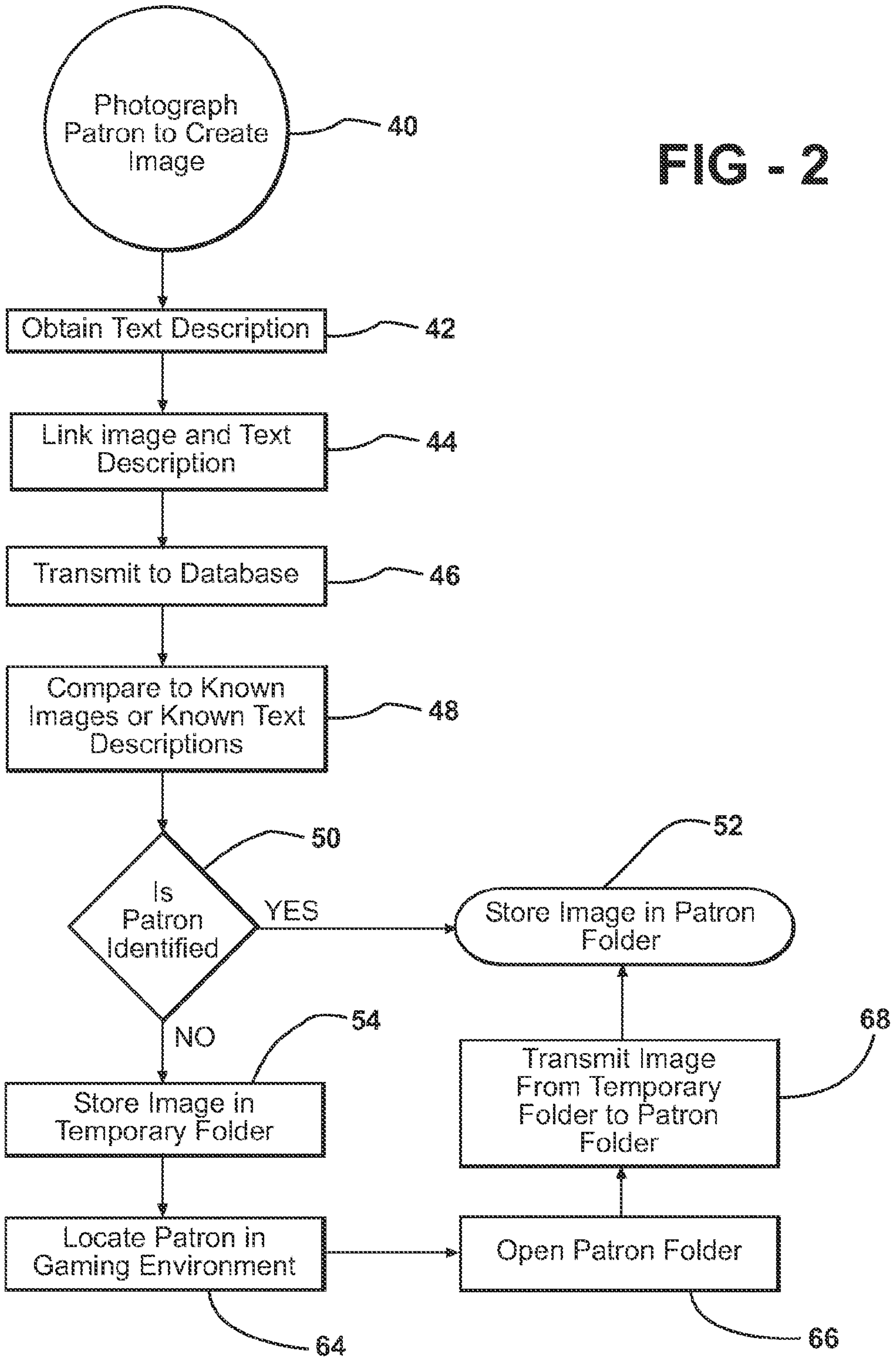
FIG. 2 is a flowchart of a first embodiment of a method for tracking the patron within the gaming environment in accordance with the subject invention.

Referring now to FIG. 2, the subject invention also provides for a method of tracking the patron in the gaming environment 34 to distinguish between existing patrons and new patrons and to track their gaming activities. The method includes a first step 40 of photographing the patron with the image capture device 12 to create the image. The patron is photographed remotely within the gaming environment 34 as previously described using the image capture device 12 such as the cellular phone or PDA equipped with the camera. Next, in step 42, the text description of the patron is obtained using the text input device 14. Once the text description has been obtained, the image and the text description are linked together into the electronic communication in step 44. When linked, the image and the text description are compiled into the electronic communication and transmitted to the database 18 using any known transfer protocol in step 46.

Figure 3:
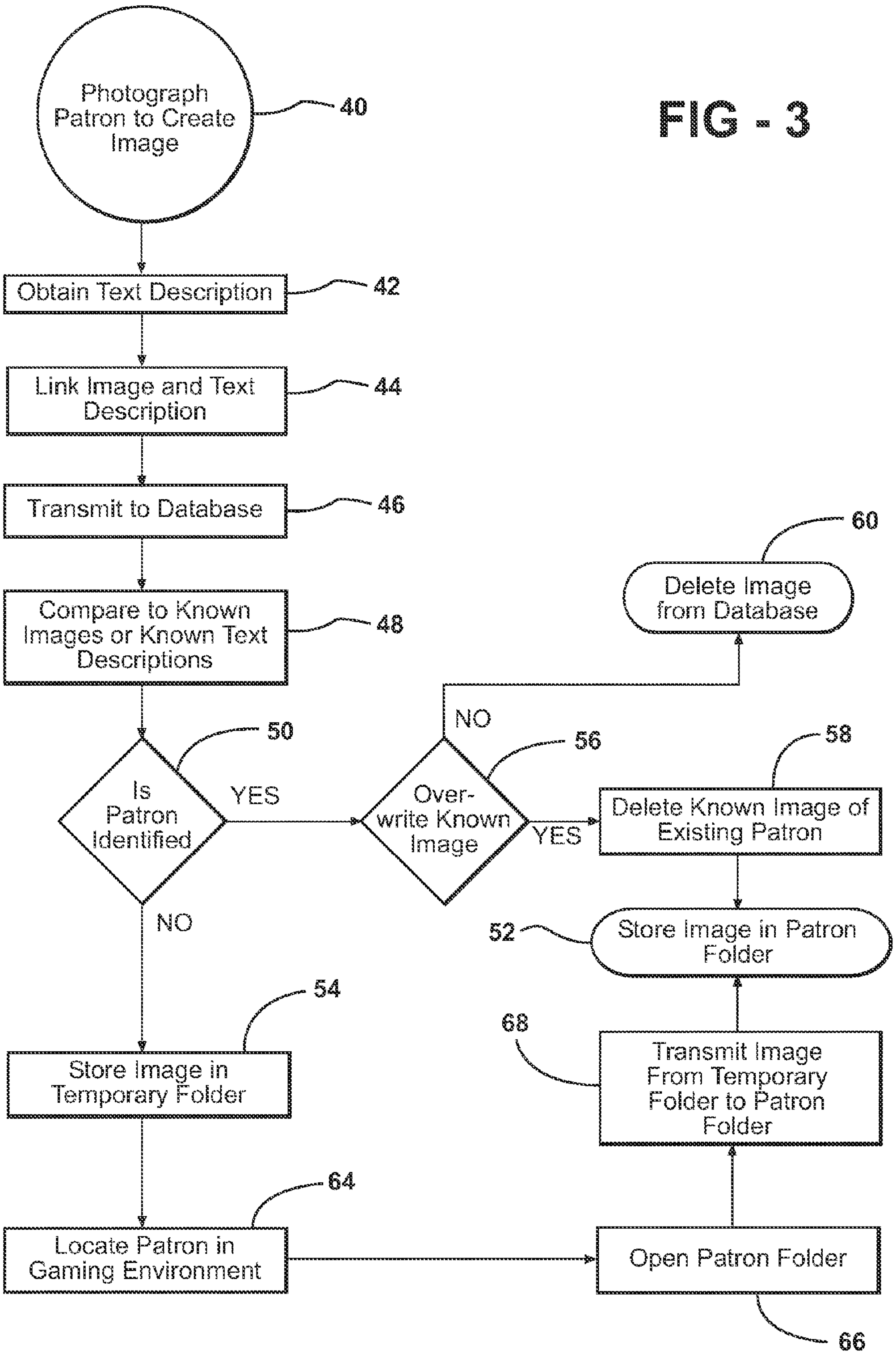
FIG. 3 is a flowchart of a second embodiment of the method for tracking the patron within the gaming environment in accordance with the subject invention.
Figure 4:
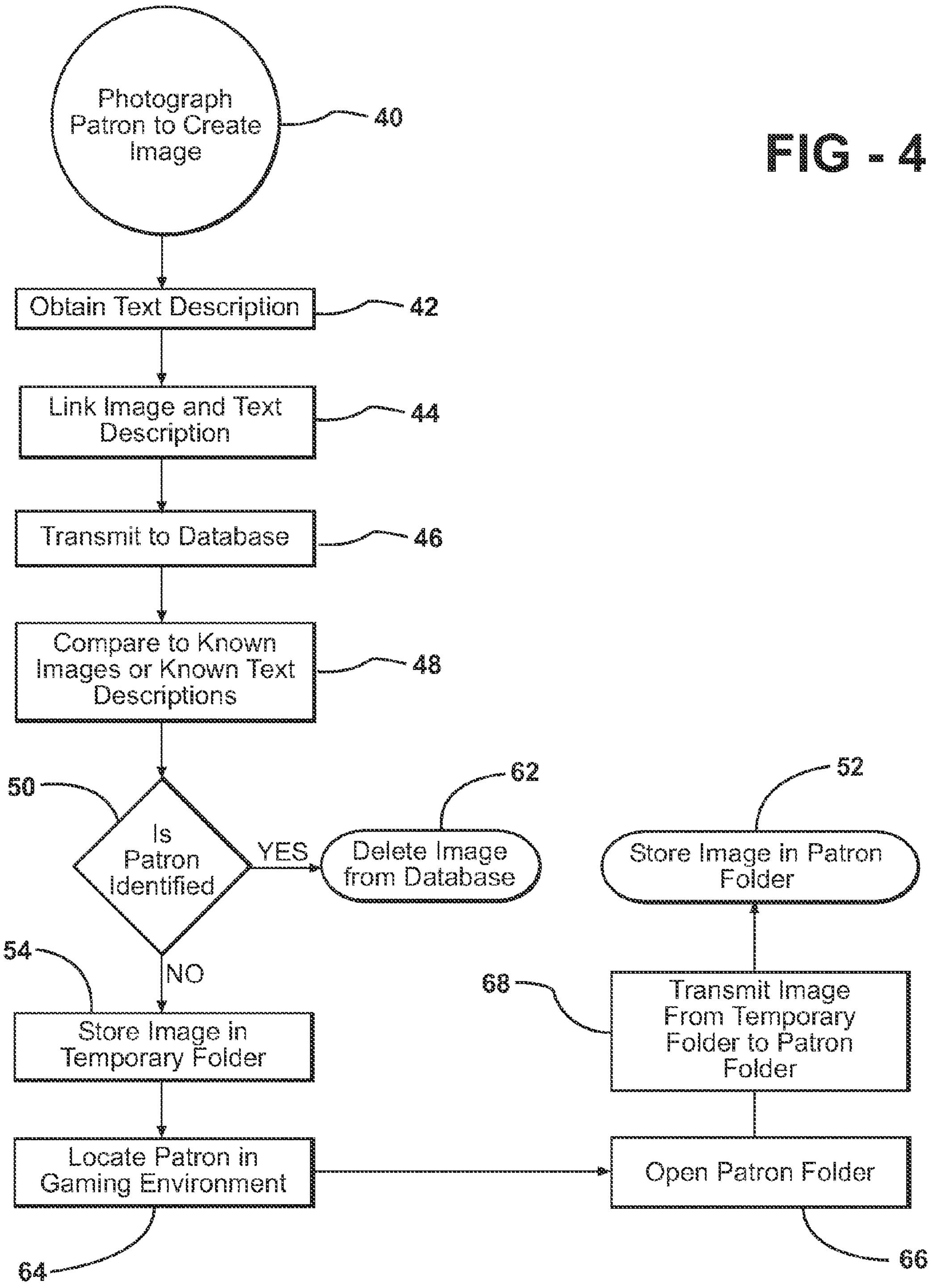
FIG. 4 is a flowchart of a third embodiment of the method for tracking the patron within the gaming environment in accordance with the subject invention.

Once received by the database 18, the method further includes a step 48 of comparing the image or the text description to the plurality of known images and known text descriptions 22 stored in the database 18 to determine if the patron is in the group of existing patrons as shown in step 50. Then, in steps 52 and 54 the image is stored in the patron folder 28 or the temporary folder 30 after the image is compared to known images or the text description is compared to known text descriptions to determine whether the image or text description correspond to one of the existing patrons. If the image or the text description corresponds to one of the existing patrons, the image is stored in the patron folder 28 that corresponds with the existing patron as shown in step 52. In one embodiment, as depicted in FIG. 3, the known image corresponding to the existing patron may be overwritten and replaced in the patron folder 28 with the image as shown in steps 56 and 58. Alternatively, the image is deleted if the known image corresponding to the existing patron is favored over the image as shown in step 60. In another embodiment, as depicted in FIG. 4, the known image of the existing patron is favored over the image, so the image is deleted from the database 18 as soon as the patron is identified as shown in step 62. Therefore, if the patron folder 28 already includes the known image of the existing patron, the image may replace the known image, or both the image and the known image may be stored in the patron folder 28. Alternatively, the image may be discarded in favor of the known image so the only image remaining in the patron folder 28 is the known image. In each embodiment, if the image or text description fails to correspond with one of the existing patrons, the image is deemed to be of a new patron and is stored in the temporary folder 30.

Various techniques may be employed to determine whether the image or the text description correspond to one of the existing patrons such as facial recognition techniques to match the image to the plurality of known images. Alternatively, the text description is read from the electronic communication and compared to the known text descriptions stored on the database 18. The known text descriptions include any text associated with the patron or the image. For example, if the patron folder 28 is named after the patron, the known text description is the patron's name, and the text description provided by the text input device 14 is the name of the patron photographed. By matching the text description to the known text descriptions, the image is placed in the patron folder 28 having the same name as the patron. It should be understood that the text description could include any other patron identifier besides the patron's name. Also, it should be understood that the patron may be identified using either or both of the techniques described above.

It is advantageous to have the new patron open an account so the method further includes a step 64 of locating the new patron in the gaming environment 34. The new patron is located by determining where inside the gaming environment 34 the image was captured, or by sending an employee to find the new patron within the gaming environment 34 using the image of the new patron. Once located, as shown in step 66, the patron folder 28 that corresponds to the new patron is opened in the database 18. Then, in step 68 the image is transferred from the temporary folder 30 to the patron folder 28 of the new patron. Activity data collected by the activity accumulator 38 at the gaming station 36 stored in the temporary folder 30 is transferred from the temporary folder 30 to the patron folder 28 as well.

Obviously, many modifications and variations of the present invention are possible in light of the above teachings. For example, multiple databases 18 may be used to store the image and the text description, and any type of image capture device 12 may be used to capture the image and generate the text description of the image. The invention may be practiced otherwise than as specifically described within the scope of the appended claims.

What is claimed is:

1. A method of tracking a patron in a gaming environment to distinguish between existing patrons and new patrons to track their gaming activities, said method utilizing at least one database having a patron folder and a temporary folder with a plurality of known images and known text descriptions stored in the patron folder, said method comprising the steps of:

photographing the patron to create an image, obtaining a text description of the patron, linking the image and the text description together into an electronic communication, transmitting the electronic communication to the database, comparing at least one of the image and the text description to determine if the at least one of the image and the text description is equivalent to one of the plurality of known images and known text descriptions stored in the database, and storing at least one of the image and the text description in the temporary folder if at least one of the image is different than the known images and the text description is different than the known text descriptions stored in the database to distinguish an existing patron from a new patron and to track the gaming activities of the patron.

2. A method as set forth in claim 1 further including the step of locating the new patron in the gaming environment.

3. A method as set forth in claim 2 further including the step of opening a new patron folder in the database that corresponds to the new patron after locating the patron.

4. A method as set forth in claim 3 further including the step of transferring at least one of the image and the text description from the temporary folder to the new patron folder.

5. A method as set forth in claim 1 wherein said step of transmitting the electronic communication to the database is further defined as wirelessly transmitting the electronic communication to the database.

6. A method as set forth in claim 1 wherein said step of photographing the patron to create the image is further defined as remotely photographing the patron to create the image.

7. A method as set forth in claim 1 wherein said step of transmitting the electronic communication to the database is further defined as electronically mailing the electronic communication to the database.

8. A method as set forth in claim 1 further including the step of saving at least one of the image and the text description in the patron folder if at least one of the image is equivalent to the known images and the text description is equivalent to the known text descriptions stored in the database to distinguish the patron between an existing patron and a new patron and to tracking the gaming activities of the patron.

9. A patron tracking system comprising:

an image capture device for capturing an image of a patron, a text input device in communication with said image capture device for providing a text description associated with the image, a communication software program in communication with said image capture device and said text input device for combining the image and the text description into an electronic communication, a database having a patron folder and a temporary folder in communication with said image capture device and said text input device and having a plurality of known images and known text descriptions, an image filer in communication with said database for filing the image in said database at a file location, a comparator in communication with said database and at least one of said image capture device and said text input device for comparing at least one of said image to the known images and said text description to the known text descriptions stored on said database, and the image filer for storing at least one of the image and the text description in the temporary folder if at least one of the image is different than the known images and the text description is different than the known text descriptions stored in the database to distinguish an existing patron from a new patron and to track the gaming activities of the patron.

10. A patron tracking system as set forth in claim 9 wherein said database has a patron folder for storing the image of an existing patron.

11. A patron tracking system as set forth in claim 10 wherein said database has a temporary folder for storing the image of a new patron.

12. A patron tracking system as set forth in claim 11 further including a transfer software program in communication with said patron folder and said temporary folder on said database for moving at least one of the image and the text description from the temporary folder to the patron folder.

13. A patron tracking system as set forth in claim 9 wherein the electronic communication is an email.

14. A patron tracking system as set forth in claim 9 wherein the image capture device is a cellular phone.

15. A patron tracking system as set forth in claim 9 wherein the text input device is a cellular phone.

16. A patron tracking system as set forth in claim 9 wherein the image capture device is a personal digital assistant.

17. A patron tracking system as set forth in claim 9 wherein the text input device is a personal digital assistant.

18. A patron tracking system as set forth in claim 9 further including a gaming station in communication with said database.

19. A patron tracking system as set forth in claim 18 further including an activity accumulator in communication with said gaming station for collecting activity data about the patron.

20. A patron tracking system as set forth in claim 18 wherein said gaming station is in wireless communication with said database.

* * * * *